(12) United States Patent
Bender

(10) Patent No.: US 11,988,264 B2
(45) Date of Patent: May 21, 2024

(54) HYDRAULIC DAMPER WITH A BAFFLE

(71) Applicant: DRIV AUTOMOTIVE INC., Lake Forest, IL (US)

(72) Inventor: Michael Alan Bender, Carleton, MI (US)

(73) Assignee: DRiV Automotive Inc., Lake Forest, IL (US)

( * ) Notice: Subject to any disclaimer, the term of this patent is extended or adjusted under 35 U.S.C. 154(b) by 273 days.

(21) Appl. No.: 17/505,131

(22) Filed: Oct. 19, 2021

(65) Prior Publication Data
US 2023/0120905 A1 Apr. 20, 2023

(51) Int. Cl.
F16F 9/19 (2006.01)
F16F 9/32 (2006.01)
F16F 9/34 (2006.01)

(52) U.S. Cl.
CPC ............ *F16F 9/19* (2013.01); *F16F 9/3235* (2013.01); *F16F 9/34* (2013.01); *F16F 2222/12* (2013.01)

(58) Field of Classification Search
CPC .......... F16F 9/19; F16F 9/3235; F16F 9/3242; F16F 9/34; F16F 2222/12
See application file for complete search history.

(56) References Cited

U.S. PATENT DOCUMENTS

| | | | | |
|---|---|---|---|---|
| 2,803,313 A * | 8/1957 | Ulmann | ................... | F16F 9/512 137/538 |
| 4,364,457 A * | 12/1982 | Wossner | ............... | F16F 9/3242 267/217 |
| 4,676,518 A * | 6/1987 | Kartchner | ............. | B62K 21/02 277/910 |
| 5,598,905 A * | 2/1997 | Rudloff | ................. | B21D 39/04 29/513 |
| 5,934,697 A * | 8/1999 | McAndrews | .......... | B62K 25/08 267/293 |
| 5,990,441 A * | 11/1999 | Zaenglein | ............. | F16F 9/3271 219/78.16 |
| 6,279,914 B1 * | 8/2001 | Yamanaka | ........... | F16J 15/3268 277/394 |

(Continued)

FOREIGN PATENT DOCUMENTS

DE 102013109370 A1 10/2014
DE 102018101548 A1 7/2019
(Continued)

OTHER PUBLICATIONS

PCT International Search Report and the Written Opinion of the International Searching Authority for Counterpart PCT/US2022/046852, dated Mar. 6, 2023, 13 Pages.

*Primary Examiner* — Robert A. Siconolfi
*Assistant Examiner* — James K Hsiao
(74) *Attorney, Agent, or Firm* — McGarry Bair PC

(57) ABSTRACT

A baffle press-fit against an inner portion of an outer tube defining an interior of a hydraulic damper. The baffle comprising a first wall, a second wall, opposite the first wall, a circumferential third wall, and a channel formed between at least a portion of the circumferential third wall and the inner portion of the outer tube. The channel comprising an inlet formed along at least a portion of the first wall, an outlet formed along at least a portion of the second wall, and a groove formed along at least a portion of the circumferential third wall and fluidly coupling the inlet to the outlet.

22 Claims, 5 Drawing Sheets

(56) References Cited

U.S. PATENT DOCUMENTS

| | | | |
|---|---|---|---|
| 6,283,259 B1 * | 9/2001 | Nakadate | F16F 9/369 |
| | | | 188/299.1 |
| 6,334,618 B1 * | 1/2002 | Ohta | F16J 15/3244 |
| | | | 277/569 |
| 6,793,206 B2 * | 9/2004 | Reh | F16F 13/106 |
| | | | 267/140.13 |
| 6,820,729 B2 * | 11/2004 | Verriet | F16J 15/56 |
| | | | 188/322.17 |
| 6,978,711 B1 * | 12/2005 | Van der Blom | F04B 39/0005 |
| | | | 92/6 R |
| 7,686,308 B2 * | 3/2010 | Van Schoor | F16J 15/008 |
| | | | 277/564 |
| 8,459,419 B2 | 6/2013 | Jinnouchi | |
| 8,931,603 B2 * | 1/2015 | Bohrer | F16F 9/36 |
| | | | 188/320 |
| 9,441,698 B2 | 9/2016 | Suzuki et al. | |
| 9,969,072 B2 * | 5/2018 | Fuenfer | B21C 37/30 |
| 10,107,351 B2 | 10/2018 | Chyla et al. | |
| 2006/0175796 A1 * | 8/2006 | Ohlin | B62K 25/08 |
| | | | 280/276 |
| 2007/0176392 A1 | 8/2007 | Schiffer et al. | |
| 2008/0258406 A1 * | 10/2008 | Dahlheimer | F16J 15/3276 |
| | | | 277/569 |
| 2013/0206524 A1 * | 8/2013 | Bohrer | F16F 9/36 |
| | | | 188/317 |
| 2014/0167380 A1 * | 6/2014 | Ogura | F16F 9/18 |
| | | | 280/276 |
| 2016/0017951 A1 * | 1/2016 | Matsumoto | F16F 9/3415 |
| | | | 188/314 |
| 2018/0051766 A1 * | 2/2018 | Yamagai | F16F 9/3235 |
| 2020/0284312 A1 * | 9/2020 | Yamazaki | F16F 9/3214 |
| 2021/0317891 A1 * | 10/2021 | Gilbert | F16F 9/0218 |

FOREIGN PATENT DOCUMENTS

| | | |
|---|---|---|
| EP | 2559911 A2 | 2/2013 |
| EP | 3179344 A1 | 10/2020 |
| JP | 2014008881 A | 1/2014 |
| JP | 6391363 B2 | 9/2018 |
| KR | 20110120558 A | 11/2011 |
| KR | 101217279 B1 | 12/2012 |
| WO | 201862221 A1 | 4/2018 |
| WO | 2019008778 A1 | 1/2019 |

* cited by examiner

HYDRAULIC DAMPER WITH A BAFFLE

TECHNICAL FIELD

The disclosure generally relates to a hydraulic damper, specifically a hydraulic damper of a steering assembly.

BACKGROUND

A hydraulic damper, and particularly a hydraulic damper of a steering assembly, is a damping mechanism that is used to stabilize or otherwise minimize an uncontrolled oscillation of the steering assembly. The hydraulic damper can include a tube defining a reservoir containing at least a hydraulic fluid, an oscillating member or rod extending through at least portion of the reservoir, and a valve fluidly coupled to the reservoir. The valve can define a hydraulic fluid channel that can act as an inlet for the hydraulic fluid within the reservoir. The oscillating member, at one end, can be operably coupled to an oscillating, moving, or otherwise non-static portion of the steering assembly (e.g., a lever arm coupled to a wheel). The movement of the non-static portion that the oscillating rod is coupled to can cause the movement of the oscillating rod through the reservoir. This, in turn, can direct the hydraulic fluid through valving provided within the hydraulic damper, thus creating a damping effect on the non-static portion of the steering assembly.

During manufacture of the hydraulic damper, a portion of the reservoir can contain a non-hydraulic fluid (e.g., air). As such, during the operation of the hydraulic damper when the hydraulic fluid flows through the valving, the non-hydraulic fluid can as well. This, in turn, can cause aeration, cavitation, or foaming within the valve, which can ultimately reduce the effectiveness or lifespan of the valve and hydraulic damper of the steering assembly.

BRIEF DESCRIPTION

In one aspect, the disclosure relates to a baffle press-fit against an inner portion of an outer tube defining an interior of a hydraulic damper, the baffle comprising a first wall, a second wall, opposite the first wall, a circumferential third wall interconnecting the first wall and the second wall and confronting the inner portion of the outer tube, and a channel formed between at least a portion of the circumferential third wall and the inner portion of the outer tube, the channel comprising an inlet formed along at least a portion of the first wall and the circumferential third wall, and defined by a first cross-sectional area, an outlet formed along at least a portion of the second wall and the circumferential third wall, and defined by a second cross-sectional area, and a groove formed along at least a portion of the circumferential third wall and fluidly coupling the inlet to the outlet, and defined by a third cross-sectional area, wherein the third cross-sectional area is constant between the inlet and the outlet.

In another aspect, the disclosure relates to a hydraulic damper comprising an outer tube including an inner portion and defining a first interior, a first hydraulic reservoir formed within the first interior and including a hydraulic fluid, and a baffle provided within the first hydraulic reservoir of the outer tube and confronting the inner portion, the baffle comprising a first wall, a second wall, a circumferential third wall interconnecting the first wall and the second wall and confronting the inner portion of the outer tube, an inlet formed along at least a portion of the first wall and the circumferential third wall, and defined by a first cross-sectional area, an outlet formed along at least a portion of the second wall and the circumferential third wall, and defined by a second cross-sectional area, and a groove formed along at least a portion of the circumferential third wall and fluidly coupling the inlet to the outlet, and defined by a third cross-sectional area, wherein the third cross-sectional area is constant between the inlet and the outlet.

In yet another aspect, the disclosure relates to a hydraulic damper comprising a cylindrical outer tube including an inner portion and defining a first interior and a centerline extending parallel to the inner portion, a first hydraulic reservoir formed within the first interior and including a hydraulic fluid and a non-hydraulic fluid, and a baffle provided within the first hydraulic reservoir of the outer tube and circumscribed by the outer tube, the baffle comprising a first wall, a second wall, a circumferential third wall interconnecting the first wall and the second wall and confronting the inner portion of the outer tube, an inlet formed along at least a portion of the first wall and the circumferential third wall, and defined by a first cross-sectional area, an outlet formed along at least a portion of the second wall and the circumferential third wall, and defined by a second cross-sectional area, and a groove formed along at least a portion of the circumferential third wall and fluidly coupling the inlet to the outlet.

BRIEF DESCRIPTION OF THE DRAWINGS

A full and enabling disclosure of the present description, including the best mode thereof, directed to one of ordinary skill in the art, is set forth in the specification, which refers to the appended FIGS., in which.

DETAILED DESCRIPTION

Figure 1:
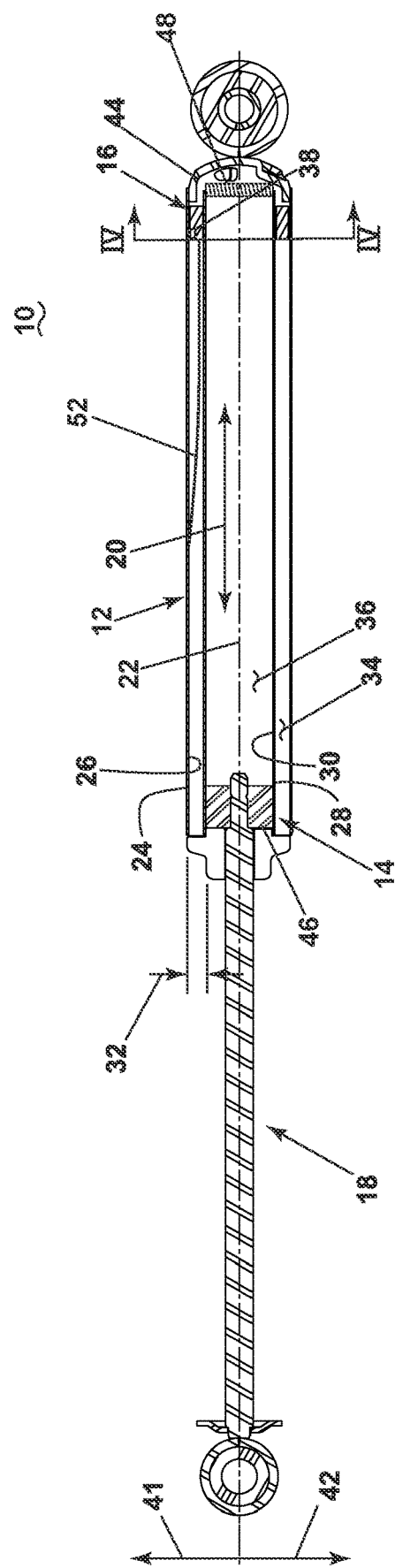
FIG. 1 is a schematic cross-sectional diagram of a hydraulic damper including an outer tube, an inner tube, and a baffle press-fit between the inner tube and the outer tube.

Aspects of this disclosure described herein are broadly directed to a hydraulic damper including an outer tube, an inner tube and a baffle press-fit between the inner and outer tube. A space formed between the inner tube and the outer tube can define a first hydraulic reservoir containing a hydraulic fluid and a non-hydraulic fluid, while an interior of the inner tube can define a second hydraulic reservoir fluidly coupled to the first hydraulic reservoir, with the second reservoir only containing the hydraulic fluid. As used herein, the term "non-hydraulic fluid", or iterations thereof, can refer to any non-compressible gas, liquid, or substance that is not a hydraulic fluid such as, but not limited to, air. The baffle can be received within the first hydraulic fluid reservoir upstream the second hydraulic fluid reservoir and include a channel along a portion of the baffle. The channel is configured to establish a tortuous path for the hydraulic fluid to flow through, such that the non-hydraulic fluid has a difficult time to flow through the channel and to the outlet. The channel can be sized such that it retards, slows, stops, impedes or otherwise restricts the non-hydraulic fluid from flowing through the channel. This ultimately greatly reduces the amount of non-hydraulic fluid that flows through the baffle and into the second hydraulic reservoir, or through valving within the hydraulic damper. The hydraulic damper can be utilized within any suitable damping mechanism. As a non-limiting example, the hydraulic damper can be utilized within a steering assembly for a vehicle. It will be understood, however, that aspects of the disclosure described herein are not so limited and can have general applicability within other assemblies including a hydraulic damper. For example, the disclosure can have applicability for hydraulic damper in other applications or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. Furthermore, as used herein, the term "set" or a "set of elements" can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

FIG. 1 is a schematic cross-sectional diagram of a hydraulic damper 10 including an outer tube 12, an inner tube 14, and a baffle 16 press-fit between the inner tube 14 and the outer tube 12. The hydraulic damper 10 can further include a moveable rod 18 which can move within the hydraulic damper 10 in the direction indicated by arrow 20 to define a centerline 22. The hydraulic damper 10 can further be split into two sections, a first half 41 and a second half 42. As a non-limiting example, the hydraulic damper 10 can be defined as a horizontal hydraulic damper 10 such that the first half 41 is an upper half 41 and the second half 42 is a lower half 42.

The outer tube 12 can include an outer portion 24 and an inner portion 26, opposite the outer portion 24. At least a portion of the inner portion 26 can confront an outer portion of the baffle 16. The inner tube can include an outer portion 28 and an inner portion 30, opposite the outer portion 28. The outer portion 28 can confront an inner portion of the baffle 16. Both the outer tube 12 and the inner tube 14 can be formed as hollow cylinder, with the outer tube 12 circumscribing the inner tube 14.

The inner tube 14 can be provided within a first interior of the outer tube 12. The outer portion 28 of the inner tube 14 can be spaced from the inner portion 26 of the outer tube to define space or gap 32. The inner tube 14 can further be defined by a second interior. Both the first interior and the second interior can include a compressible fluid such as a hydraulic fluid. As a non-limiting example, the hydraulic fluid can be any suitable hydraulic fluid for use within the hydraulic damper 10. As such, the first interior, defined by the gap 32, can define a first hydraulic reservoir 34. The second interior, demarcated least partially by the inner portion 30 of the inner tube, can define a second hydraulic reservoir 36.

The baffle 16 can include an inlet 38 fluidly coupled to the first hydraulic reservoir 34. The inlet 38 can be provided within any portion of the first hydraulic reservoir 34. As a non-limiting example, the inlet 38 can be provided within the first half 41. As a non-limiting example, the inlet 38 can be provided within the second half 42. As another non-limiting example, the inlet 38 can be provided along the transition between the first half 41 and the second half 42. As a non-limiting example, the hydraulic damper 10 can be the horizontal hydraulic damper 10 such that the upper half 41 and the lower half 42 can be further defined by the gravitational effect on the hydraulic damper 10. As such, the upper half 41 can be a gravitational upper half 41, and the lower half 42 can be a gravitational lower half 42. As such, the inlet 38 of the baffle 16 can be provided within the gravitational lower half 42 or gravitational upper half 41 of the hydraulic damper 10. The inner tube 14 can end at a distal end to define a fluid channel 44.

The moveable rod 18 can include a piston 46 confronting the inner portion 30 of the inner tube 14. The moveable rod 18 can be coupled to an oscillating or otherwise moveable assembly or member (not illustrated) at a portion of the moveable rod 18 opposite the piston 46. As a non-limiting example, the moveable rod 18 can be coupled to a linkage, an arm, a pivot, or any suitable combination thereof. The movement of the moveable assembly can cause the movement of the moveable rod 18 in the direction indicated by arrow 20.

The baffle 16 can be provided within a portion of the first hydraulic reservoir 34 nearest the fluid channel 44. It will be appreciated, however, that the baffle 16 can be provided within any suitable portion of the first hydraulic reservoir 34. As a non-limiting example, the baffle 16 can be provided within a portion of the first hydraulic reservoir 34 opposite the fluid channel 44 (e.g., nearest the illustrated location of the piston 46). It is yet further contemplated that the baffle 16 can be operably coupled to or otherwise include other components not illustrated. As a non-limiting example, the baffle 16 can be operably coupled to a valving component of the hydraulic damper 10.

The hydraulic damper 10 can further include at least one valving component configured to limit, control, retard, or otherwise impeded the flow of hydraulic fluid. As a non-limiting example, the hydraulic damper 10 can include a valve 48 provided between the first hydraulic reservoir 34 and the second hydraulic reservoir 36. As a non-limiting example, the valve 48 can be formed within a distal end of the second hydraulic reservoir 36 and be directly fluidly coupled to both the first hydraulic reservoir 34 and the second hydraulic reservoir 36.

Figure 2:
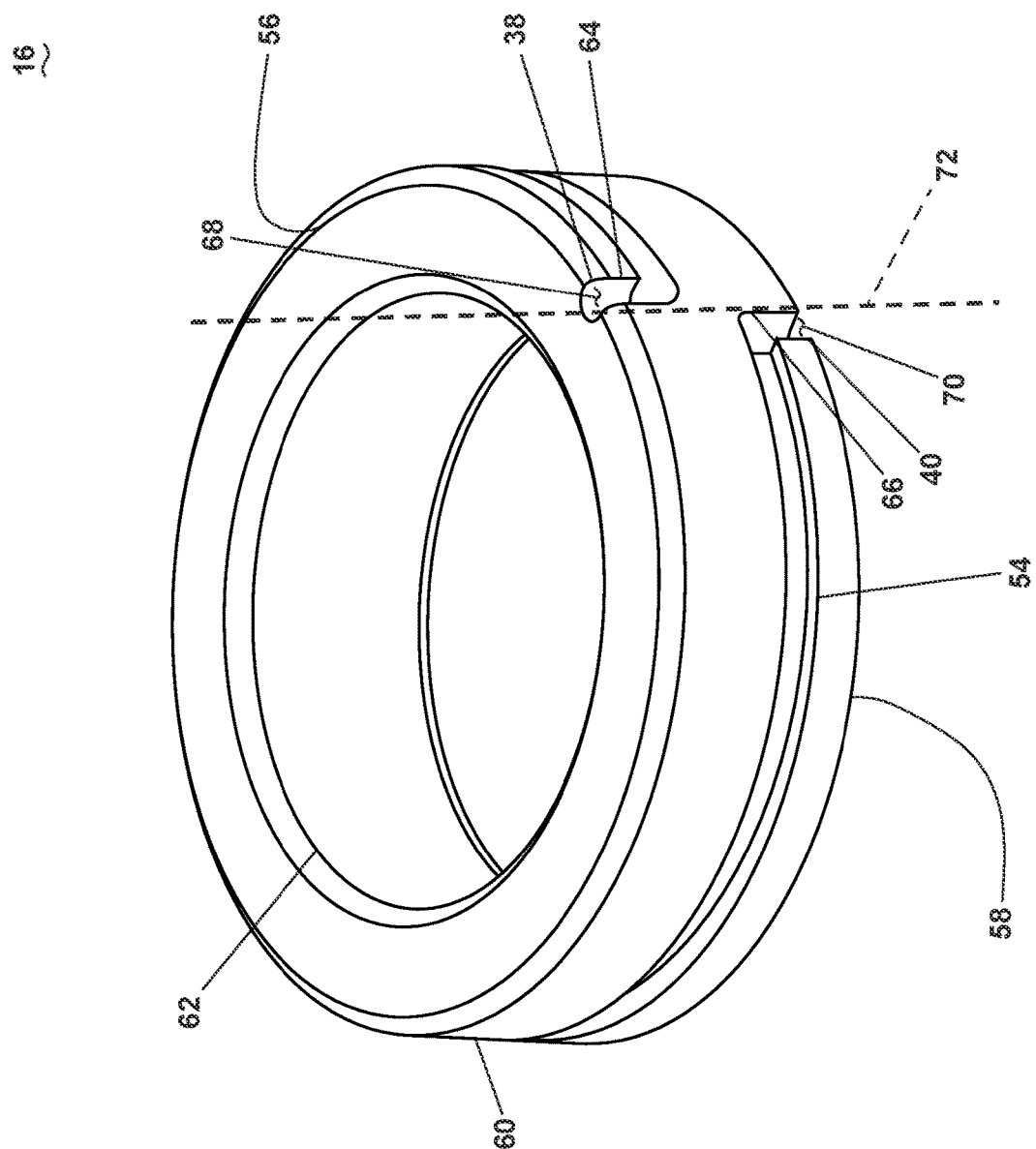
FIG. 2 is a perspective view of the baffle of FIG. 1, further illustrating an inlet, an outlet, and a groove fluidly coupling the inlet to the outlet.

FIG. 2 is a perspective view of the baffle 16 of FIG. 1, further illustrating the inlet 38 fluidly coupled to an outlet 40 through a groove 54. The baffle 16 can further include a first wall 56, a second wall 58, a third wall 60, and a fourth wall 62.

As illustrated, the outlet 40 can be provided within or along a portion of the second wall 58, while the inlet 38 can be provided within or along a portion of the first wall 56. As discussed herein, the inlet 38 can be directly fluidly coupled to the first hydraulic reservoir 34. The outlet 40 can be provided upstream of the fluid channel 44. As such, hydraulic fluid within the first hydraulic reservoir 34 can flow through the inlet 38, the groove 54 and ultimately out of the outlet 40 and through the fluid channel 44. The outlet 40, similar to the inlet 38, can be provided within any suitable portion of the first hydraulic reservoir 34. As a non-limiting example, the outlet 40 can be provided within the upper half 41 or the lower half 42.

As illustrated, the baffle 16 can be generally cylindrical in form and include a hollow interior, or otherwise form a donut-shape. As such, the first wall 56 can be spaced from the second wall 58. The third wall 60 and the fourth wall 62 can each extend between the first wall 56 and the second wall 58. The third wall 60 and the fourth wall 62 can define an outer circumference and an inner circumference, respectively, of the baffle 16. As such, the third wall 60 can be defined as a circumferential third wall 60, while the fourth wall 62 can be defined as a circumferential fourth wall 62. As a non-limiting example, the outer circumference can include an outer diameter that is 50 mm. As a non-limiting example, the inner circumference can include an inner diameter that is between 30 and 35 mm.

The inlet 38 can be formed within a portion of the first wall 56, as illustrated. It will be appreciated, however, that the inlet 38 can further define an inlet passage 64, which can extend into a portion of the third wall 60. The outlet 40 can be formed within a portion of the second wall 58, as illustrated. Similar to the inlet 38, the outlet 40 can further include an outlet passage 66, which can extend into a portion of the third wall 60. As a non-limiting example, both the inlet passage 64 and the outlet passage 66 can extend in a direction normal to the first wall 56 and the second wall 58, respectively.

The inlet 38 can further be defined by a first cross-sectional area 68 when viewed along a plane parallel to the first wall 56 and intersecting the inlet 38. The outlet 40 can further be defined by a second cross-sectional area 70 when viewed along a plane parallel to the second wall 58 and intersecting the outlet 40. The first wall 56 and the second wall 58 can be parallel or non-parallel to one another. As a non-limiting example, the first cross-sectional area 68 and the second cross-sectional area 70 can each be constant throughout the entirety of the inlet passage 64 and the outlet passage 66, respectively. As a non-limiting example, both the first cross-sectional area 68 and the second cross-sectional area 70 can be equal to one another. The first cross-sectional area 68 and the second cross-sectional area 70 can be sized such that they establish a tortuous path for the non-hydraulic fluid within the first hydraulic reservoir 34.

The groove 54 can extend around the periphery of the third wall 60 and interconnect or otherwise fluidly couple the inlet 38 and the outlet 40. As a non-limiting example, the groove 54 can extend around the periphery of the third wall 60 and interconnect or otherwise fluidly couple the inlet 38 or inlet passage 64, to the outlet 40 or outlet passage 66. The groove 54, as illustrated, can follow the contour (e.g., the outer circumference) of the baffle 16 defined by the third wall 60.

The inlet 38 and the outlet 40 can be displaced with respect to one another less than 360 degrees (indicated by line 72). Alternatively, the inlet 38 can coincide with the outlet 40 such that the inlet 38 is displaced 360 degrees with respect to the outlet 40. The groove 54 can extend across the baffle 16 such that it does not cross the line 72. In other words, the groove 54 can extend less than 360 degrees along the third wall 60. Alternatively, the groove 54 can extend at least one about the third wall 60 such that the groove extends exactly 360 degrees along the third wall 60 (e.g., the groove 54 begins and terminates at the line 72) or greater than 360 degrees along the third wall 60 (e.g., the groove 54 extends past the line 72 at least once).

Figure 3:
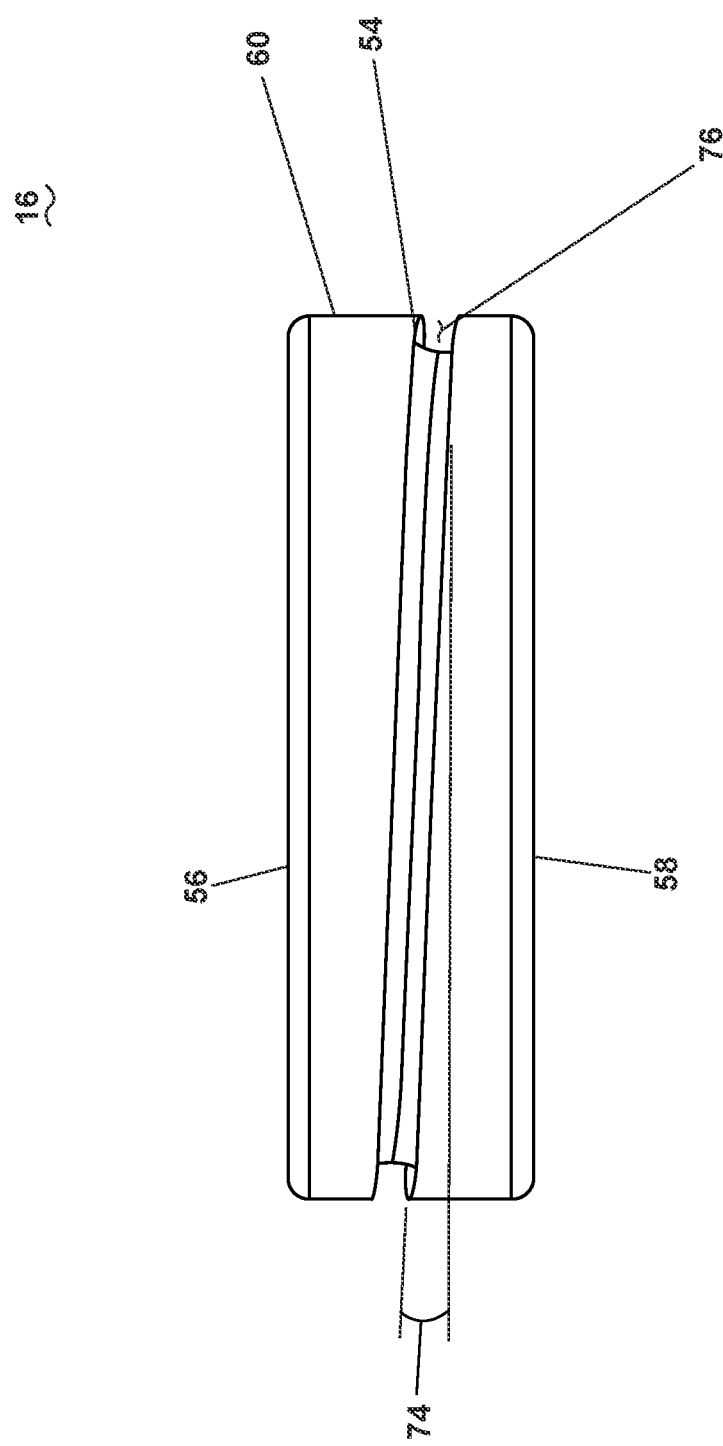
FIG. 3 is a side-view of the baffle of FIG. 2, further illustrating a pitch angle of the groove.

FIG. 3 is a side-view of the baffle 16 of FIG. 2, further illustrating a pitch angle 74 of the groove 54. The groove 54 can further be defined by a third cross-sectional area 76 when viewed along a plane normal to the third wall 60 and intersecting the groove 54.

It is contemplated that the third cross-sectional area 76 can be constant throughout the entirety of the groove 54. It is further contemplated that at least two of the first cross-sectional area 68 (FIG. 2), the second cross-sectional area 70 (FIG. 2), and the third cross-sectional area 76 can be equal to one another. As a non-limiting example, the first cross-sectional area 68, the second cross-sectional area 70, and the third cross-sectional area 76 can be equal. As such, the inlet 38, the outlet 40 and the groove 54 can be defined by a constant cross-sectional area between the inlet 38 and the outlet 40. Similar to the first cross-sectional area 68 and the second cross-sectional area 70, the third cross-sectional area 76 can be sized such that it establishes a tortuous path for the non-hydraulic fluid within the first hydraulic reservoir 34.

The pitch angle 74 can further define an angle at which the groove 54 extends as it wraps about at least a portion of the third wall 60. As a non-limiting example, the pitch angle 74 can be greater than 0 degrees and less than 90 degrees. The groove 54 can form a spiral or coil around the baffle 16. As such, the groove 54 can be further defined as a spiral groove 54. The groove 54, and hence the pitch angle 74, can begin and terminate along a portion of the inlet 38 or the outlet 40, respectively. As the inlet 38 and the outlet 40 can extend normal to the first wall 56 and the second wall 58, respectively, an angle between the inlet 38 or the outlet 40 with a corresponding portion of the groove 54 can also be defined by the pitch angle 74.

Figure 4:
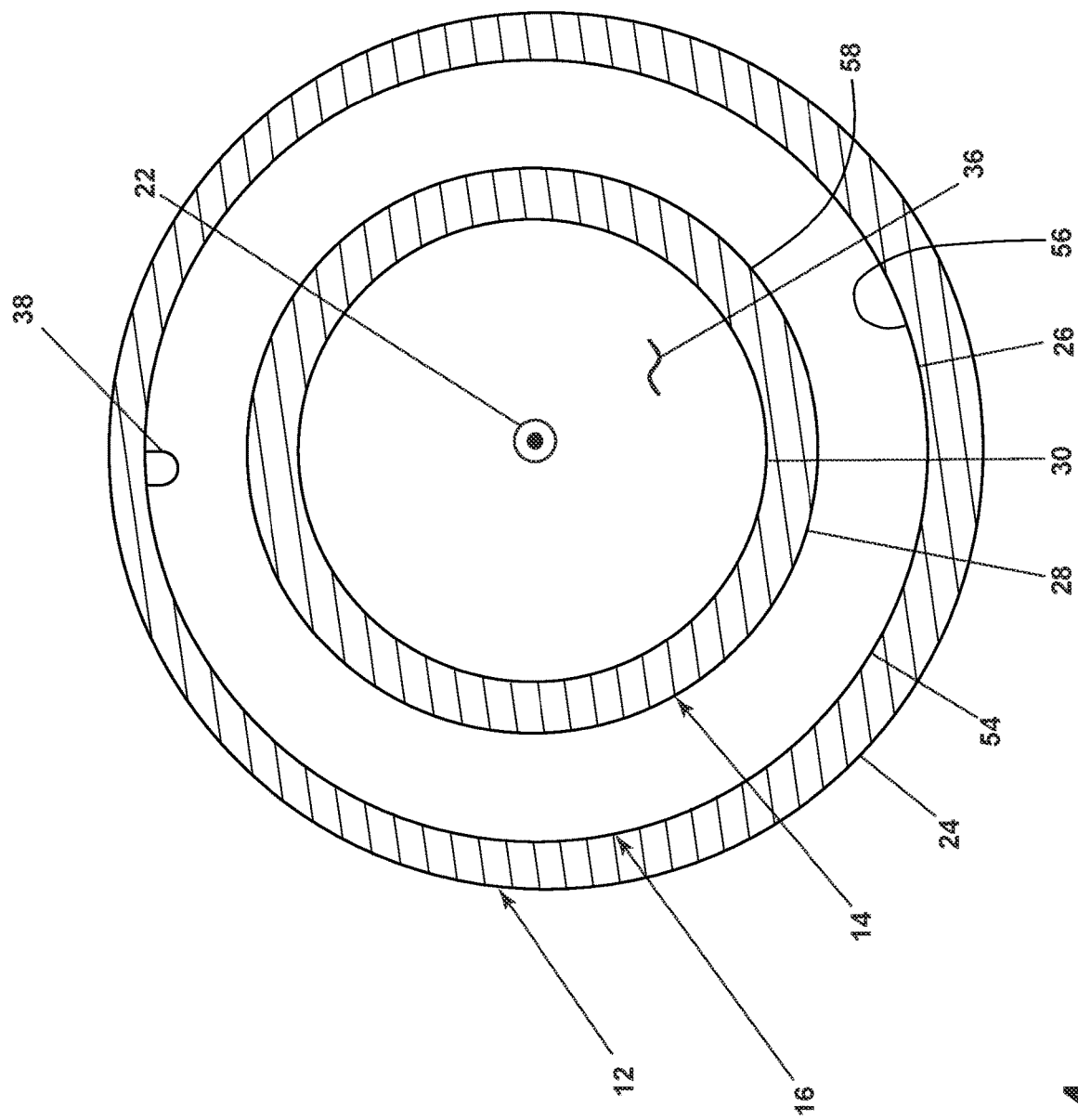
FIG. 4 is a schematic illustration of the hydraulic damper including the inner tube, the outer tube, and the baffle as seen from cut IV-IV of FIG. 1.

FIG. 4 is a schematic illustration of the hydraulic damper including the inner tube 14, the outer tube 12, and the baffle 16 as seen from cut IV-IV of FIG. 1. As discussed herein, the baffle 16 can be press-fit between the inner portion 26 of the outer tube 12 and the outer portion 28 of the inner tube 14. The baffle 16 can be provided within the first hydraulic reservoir 34 (FIG. 1).

The third wall 60 and the fourth wall 62 can each confront, and directly contact the outer tube 12 and the inner tube 14, respectively. As a non-limiting example, the third wall 60 can confront or directly contact the inner portion 26 of the outer tube 12, while the fourth wall 62 can confront or directly contact the outer portion 28 of the inner tube 14. The contact between the baffle 16 and the inner tube 14 and the outer tube 12 can define a fluid tight seal such that the baffle 16 can further define a seal provided within the first hydraulic reservoir 34.

The inlet 38 can confront the inner portion 26 of the outer tube 12. Similarly, the groove 54 (FIG. 2), and the outlet 40 (FIG. 2) can confront a corresponding portion of the inner portion 26 of the outer tube 12. As such, a channel can be formed between the inlet 38, the outlet 40, the groove 54 and the corresponding portions of the outer tube 12 that the inlet 38, the outlet 40, and the groove 54 confront. The channel can extend between the inlet 38 and the outlet 40 of the baffle 16.

With reference to FIGS. 1-4, during operation of the hydraulic damper 10, the moveable rod 18 can move in the direction indicated by arrow 20 within the second hydraulic reservoir 36. When the moveable rod 18 moves toward the valve 48, the moveable rod 18 can displace the hydraulic fluid within the second hydraulic reservoir 36. The displacement of the hydraulic fluid within the second hydraulic reservoir 36 creates an opposing force on the movement of the moveable rod 18, which ultimately creates a damping effect of the hydraulic damper 10. As such, the uncontrolled movement or oscillation of the moveable assembly that the moveable rod 18 is coupled to can be eliminated, mitigated, or otherwise limited via the damping effect created through the movement of the moveable rod 18 through the second hydraulic reservoir 36. The uncontrolled movement or oscillation of the movable assembly can further be controlled or otherwise damped by flowing at least a portion of the hydraulic fluid through a valving component (e.g., the valve 48) within the hydraulic damper 10. When the moveable rod 18 moves in the direction opposite the valve 48, however, the hydraulic fluid can be drawn via a vacuum generated by the movement of the moveable rod 18 and at least a portion of the hydraulic fluid within the first hydraulic reservoir 34 can flow through the baffle 16 (e.g., through the channel defined between the baffle 16 and the outer tube 12) and the fluid channel 44 and through the valve 48 and into the second hydraulic reservoir 36.

It is contemplated that at least a portion of the first hydraulic reservoir 34 can include a non-hydraulic fluid 52. The non-hydraulic fluid 52 can be introduced into the hydraulic damper 10 during manufacture of the hydraulic damper 10. It is contemplated that the positioning of the inlet 38 can ensure that the non-hydraulic fluid 52 does not flow through the baffle 16 and into the second hydraulic reservoir 36. As a non-limiting example, the non-hydraulic fluid can have a lower density than the hydraulic fluid such that the non-hydraulic fluid will remain in the first half 41 (e.g., the gravitational upper half 41) of the hydraulic damper 10. As such, the non-hydraulic fluid 52 will not come into contact with the portion of the baffle 16 including the inlet 38, and the non-hydraulic fluid 52 will not flow through the fluid channel 44 and into the second hydraulic reservoir 36. Further yet, even if the non-hydraulic fluid were to come into contact with the inlet 38, the inlet 38, the groove 54, and the outlet 40 are sized (e.g., the first cross-sectional area 68, the second cross-sectional area 70, and the third cross-sectional area 76) such that the non-hydraulic fluid has difficulty passing through the channel. As such, the second hydraulic reservoir 36 can be further defined as a hydraulic fluid reservoir without or otherwise absent of the non-hydraulic fluid 52. It is contemplated that it is advantageous to separate the non-hydraulic fluid 52 from the hydraulic fluid within the second hydraulic reservoir 36, as at least a portion hydraulic fluid within the second hydraulic reservoir 36 can flow into the valve 48 (thus creating additional damping) when the hydraulic fluid is displaced upon movement of the moveable rod 18 toward the valve 48. If non-hydraulic fluid were to flow into the valve 48, aeration, cavitation, or foaming can occur within the valve 48, as discussed herein. This, in turn, can reduce the effectiveness or lifespan of the valve 48 and hydraulic damper 10.

Figure 5:
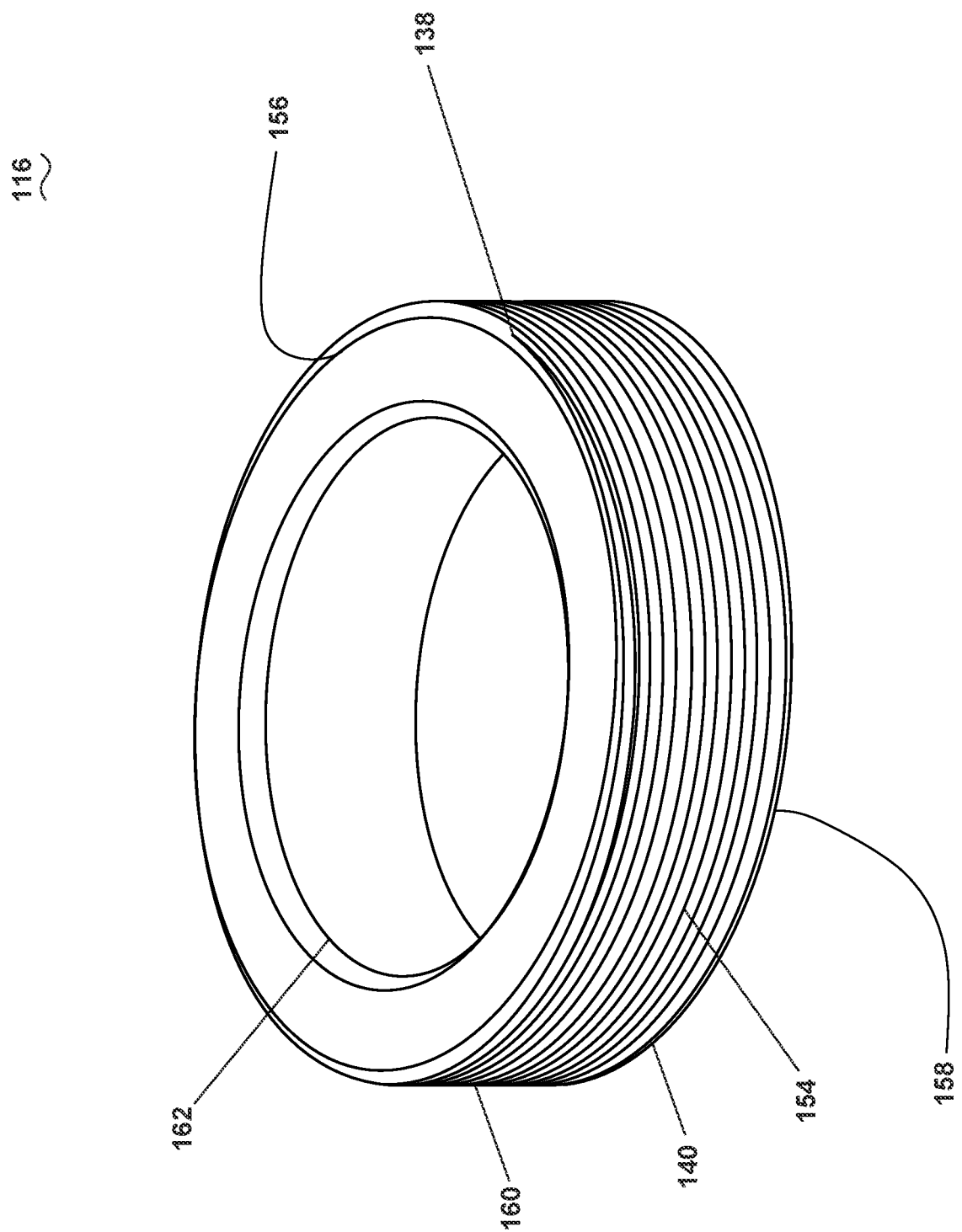
FIG. 5 is a schematic illustration of an exemplary baffle for use within the hydraulic damper of FIG. 1.

FIG. 5 is a perspective view of an exemplary baffle 116 for use within the hydraulic damper 10 of FIG. 1. The exemplary baffle 116 is similar to the baffle 16; therefore, like parts will be identified with like numerals in the 100 series, with it being understood that the description of the like parts of the baffle 16 applies to the exemplary baffle 116 unless otherwise noted.

Similar to the baffle 16, the baffle 116 can include a first wall 156, a second wall 158 spaced from the first wall 156, a third wall 160 or a circumferential third wall 160, and a fourth wall 162 or a circumferential fourth wall 162. The third wall 160 and the fourth wall 162 can interconnect the first wall 156 and the second wall 158. An inlet 138 can be formed within a portion of the first wall 156. An outlet 140 can be formed within a portion of the second wall 158. A groove 154 can be formed within a portion of the third wall 160 and extend, at least one, about an outer circumference defined by the third wall 160.

The baffle 116 is similar to the baffle 16, except that the groove 154, the inlet 138, and the outlet 140 are formed by a threaded portion provided along the third wall 160. The inlet 138 can be defined by a termination of the threaded portion along the first wall 156. The outlet 140 can be defined by a termination of threaded portion along the second wall 158. As the groove 154 is formed by the threaded portion provided on the third wall 160, the groove 154 can further be defined as a threaded groove 154. The threaded portion can have a constant cross-sectional area along the inlet 138, the outlet 140, and the groove 154. Similar to the groove 54, the groove 154 can be defined by a pitch angle that is constant between the inlet 138 and the outlet 140. It is contemplated that at least a portion of the inlet 138 or the outlet 140 can extend at the pitch angle, as opposed to normal to the first wall 56 or the second wall 58, respectively, like the inlet 38 and the outlet 40 of the baffle 16. In other words, the entire channel, at least partially defined by the groove 154, the inlet 138, and the outlet 140 can be defined by a constant pitch. Further, the entire channel, at least partially defined by the groove 154, the inlet 138, and the outlet 140 can be defined by a constant cross sectional-area.

Benefits of the present disclosure include a hydraulic damper with an improved lifespan, damping effectiveness, and sealing effectiveness when compared to conventional hydraulic dampers. For example, conventional hydraulic dampers can allow for a portion of a non-hydraulic fluid to enter the hydraulic fluid reservoir where the hydraulic fluid is being displaced (e.g., the reservoir where a moveable rod moves through). As the non-hydraulic fluid is a compressible fluid, the damping effectiveness of the hydraulic damper is decreased, or otherwise limited by the amount of non-hydraulic fluid within the hydraulic fluid reservoir that is being displaced. Further, the non-hydraulic fluid can enter the valve, which in turn, can cause aeration, cavitation, or foaming within the valve, which can ultimately reduce the effectiveness or lifespan of the valve and hydraulic damper. The hydraulic damper as described herein, however, includes the first hydraulic reservoir, including the non-hydraulic fluid and the hydraulic fluid, and the second hydraulic reservoir, including only the hydraulic fluid. This is made possible through the implementation of the baffle, and the channel formed between the baffle and the outer tube, as described herein. As a non-limiting example, the location of the baffle (e.g., within the second half or otherwise gravitational lower half) within the hydraulic damper, and the sizing of the baffle (e.g., the first, second, and third cross-sectional areas) ensure that the non-hydraulic fluid cannot flow through the channel and ultimately into the second hydraulic reservoir. This, in turn, ensure that the second hydraulic reservoir only contains hydraulic fluid. As such, aeration, cavitation, or foaming within the valve is greatly reduced when compared to a conventional hydraulic damper without the baffle as described herein. This ultimately increases the effectiveness and lifespan of the valve and hydraulic damper when compared to conventional hydraulic dampers.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A baffle press-fit against an inner portion of an outer tube defining an interior of a hydraulic damper, the baffle comprising:
   a first wall;
   a second wall, opposite the first wall;
   a circumferential third wall having a centerline axis and interconnecting the first wall and the second wall and confronting the inner portion of the outer tube; and
   a channel formed between at least a portion of the circumferential third wall and the inner portion of the outer tube, the channel comprising:
      an inlet formed along at least a portion of the first wall and the circumferential third wall, and defined by a first cross-sectional area;
      an outlet formed along at least a portion of the second wall and the circumferential third wall, and defined by a second cross-sectional area, the outlet being circumferentially offset from the inlet with respect to the centerline axis; and
      a groove formed along at least a portion of the circumferential third wall and fluidly coupling the inlet to the outlet, and defined by a third cross-sectional area, wherein the third cross-sectional area is constant between the inlet and the outlet.

2. The baffle of claim 1, wherein the third cross-sectional area is equal to both the first cross-sectional area and the second cross-sectional area.

3. The baffle of claim 1, wherein the groove defines a spiral about the circumferential third wall.

4. The baffle of claim 3, wherein the spiral includes a constant pitch between the inlet and the outlet.

5. The baffle of claim 3, wherein the circumferential third wall defines an outer circumference of the baffle, and wherein the spiral extends around the entire outer circumference at least once.

6. The baffle of claim 5, wherein the spiral is defined by a threaded spiral that wraps about the outer circumference more than once.

7. The baffle of claim 1, wherein the baffle includes a circular cross-sectional area when viewed in a plane normal to the circumferential third wall, and wherein the circumferential third wall defines an outer circumference of the baffle.

8. The baffle of claim 7, wherein the inlet is displaced between 270 and 360 degrees from the outlet along the outer circumference.

9. The baffle of claim 7, further comprising:
   a circumferential fourth wall circumscribed by the circumferential third wall and interconnecting the first wall and the second wall, and defining an inner circumference;
   wherein the inner circumference includes an inner diameter that is between 30 and 35 mm.

10. The baffle of claim 9, wherein the baffle is press-fit between the inner portion of the outer tube and an outer portion of an inner tube provided within the interior, wherein the outer tube is spaced from the inner tube to define a hydraulic fluid reservoir therebetween, and wherein the circumferential fourth wall confronts the outer portion of the inner tube.

11. The baffle of claim 1, wherein the inlet includes an inlet passage that extends along the circumferential third wall in a direction normal to the first wall, and the outlet includes an outlet passage that extends along the circumferential third wall in a direction normal to the second wall.

12. The baffle of claim 1, wherein at least one of the inlet channel and outlet channel is parallel to the centerline axis.

13. A hydraulic damper comprising:
   an outer tube including an inner portion and defining a first interior;
   a first hydraulic reservoir formed within the first interior and including a hydraulic fluid; and
   a baffle provided within the first hydraulic reservoir of the outer tube and confronting the inner portion, the baffle comprising:
      a first wall;
      a second wall;
      a circumferential third wall having a centerline axis and interconnecting the first wall and the second wall and confronting the inner portion of the outer tube;
      an inlet formed along at least a portion of the first wall and the circumferential third wall, and defined by a first cross-sectional area;
      an outlet formed along at least a portion of the second wall and the circumferential third wall, and defined by a second cross-sectional area, the outlet being circumferentially offset from the inlet with respect to the centerline axis; and
      a groove formed along at least a portion of the circumferential third wall and fluidly coupling the inlet to the outlet, and defined by a third cross-sectional area, wherein the third cross-sectional area is constant between the inlet and the outlet.

14. The hydraulic damper of claim 13, wherein the third cross-sectional area is equal to both the first cross-sectional area and the second cross-sectional area.

15. The hydraulic damper of claim 13, wherein the baffle includes a circular cross-sectional area when viewed in a plane normal to the circumferential third wall, and wherein the circumferential third wall defines an outer circumference of the baffle.

16. The hydraulic damper of claim 15, wherein the groove defines a spiral including a constant pitch that extends about the outer circumference at least once, and wherein the inlet is displaced between 270 degrees and 360 degrees from the outlet along the outer circumference.

17. The hydraulic damper of claim 15, further comprising:
   an inner tube provided within the first interior and including an outer portion spaced from the inner portion to define the first hydraulic reservoir, the inner tube defining a second interior fluidly coupled to the first interior;

a second hydraulic reservoir fluidly coupled to the first hydraulic reservoir and formed within the second interior and including the hydraulic fluid; and a moveable rod extending through the second interior;

wherein a movement of the moveable rod forces the hydraulic fluid within the first hydraulic reservoir through the inlet, the groove, and the outlet and into the second hydraulic reservoir; and wherein the baffle further comprises:

a circumferential fourth wall circumscribed by the circumferential third wall and interconnecting the first wall and the second wall, the circumferential fourth wall including an inner circumference including an inner diameter;

wherein the circumferential fourth wall circumscribes the outer portion of the inner tube, and the circumferential third wall is circumscribed by inner portion of the outer tube; and wherein the inner circumference includes an inner diameter that is between 30 and 35 mm.

18. The hydraulic damper of claim 13, wherein at least one of the inlet channel and outlet channel is parallel to the centerline axis.

19. A hydraulic damper comprising:

a cylindrical outer tube including an inner portion and defining a first interior and a centerline extending parallel to the inner portion;

a first hydraulic reservoir formed within the first interior and including a hydraulic fluid and a non-hydraulic fluid; and a baffle provided within the first hydraulic reservoir of the outer tube and circumscribed by the outer tube, the baffle comprising:

a first wall;

a second wall;

a circumferential third wall having a centerline axis and interconnecting the first wall and the second wall and confronting the inner portion of the outer tube;

an inlet formed along at least a portion of the first wall and the circumferential third wall, and defined by a first cross-sectional area;

an outlet formed along at least a portion of the second wall and the circumferential third wall, and defined by a second cross-sectional area, the outlet being circumferentially offset from the inlet with respect to the centerline axis; and a groove formed along at least a portion of the circumferential third wall and fluidly coupling the inlet to the outlet.

20. The hydraulic damper of claim 19, wherein the hydraulic damper is split into an upper half and a lower half with respect to a plane extending along the centerline, with the inlet being provided in the upper half, and at least a portion of the groove being provided in the lower half.

21. The hydraulic damper of claim 19, further comprising:

an inner tube provided within the first interior and including an outer portion spaced from the inner portion to define the first hydraulic reservoir, the inner tube defining a second interior fluidly coupled to the first interior; and a second hydraulic reservoir fluidly coupled to the first hydraulic reservoir and formed within the second interior and including the hydraulic fluid.

22. The hydraulic damper of claim 21, wherein the baffle permits only a flow of hydraulic fluid within the first hydraulic reservoir such that the second hydraulic reservoir only includes the hydraulic fluid.

* * * * *